US012561301B2

(12) United States Patent
Fitt et al.

(10) Patent No.: US 12,561,301 B2
(45) Date of Patent: Feb. 24, 2026

(54) FILTERED PRODUCT STRUCTURE

(71) Applicant: Siemens Industry Software Inc.,
Plano, TX (US)

(72) Inventors: Andrew Fitt, Cambridge (GB); Nusrat Hamid, Cambridge (GB)

(73) Assignee: Siemens Industry Software Inc.,
Plano, TX (US)

( * ) Notice: Subject to any disclaimer, the term of this patent is extended or adjusted under 35 U.S.C. 154(b) by 0 days.

(21) Appl. No.: 18/712,096

(22) PCT Filed: Dec. 3, 2021

(86) PCT No.: PCT/US2021/061740
§ 371 (c)(1),
(2) Date: May 21, 2024

(87) PCT Pub. No.: WO2023/101680
PCT Pub. Date: Jun. 8, 2023

(65) Prior Publication Data
US 2025/0021538 A1      Jan. 16, 2025

(51) Int. Cl.
*G06F 16/22* (2019.01)
*G06F 16/28* (2019.01)

(52) U.S. Cl.
CPC ........ *G06F 16/2246* (2019.01); *G06F 16/282* (2019.01)

(58) Field of Classification Search
CPC .. G06F 16/2246; G06F 16/282; G06F 16/248; G06F 16/245; G06F 16/9027; G06F 16/838; G06Q 10/0875; G06Q 50/04
(Continued)

(56) References Cited

U.S. PATENT DOCUMENTS

2002/0126545 A1* 9/2002 Warren ............. G06F 16/24539
365/200
2003/0126115 A1 7/2003 Solomon
(Continued)

FOREIGN PATENT DOCUMENTS

WO 2010025312 A2 3/2010

OTHER PUBLICATIONS

International Search Report and Written Opinion for International Application No. PCT/US2021/061740.

*Primary Examiner* — Phong H Nguyen
(74) *Attorney, Agent, or Firm* — Lempia Summerfield Katz LLC

(57) ABSTRACT

A computer-implemented method of providing a view of a filtered hierarchical data structure is described. A user views an initial view of a hierarchical data structure showing at least one branch value at an $n^{th}$ level expansion and provides a filter. A pre-constructed query index corresponding to the filter is queried against the hierarchical data structure to identify unconfigured paths to descendant values of a first child of $n^{th}$ level branch value. The descendant value and branch values between the descendant value and the branch value shown in the $n^{th}$ level expansion are marked as displayable when the filter is met. The process is repeated for all other branch values shown in the initial view. A revised view showing only those values from the initial view in which the branch value, a child value, or a descendant value were marked as displayable is then displayed to the user.

17 Claims, 6 Drawing Sheets

(58) Field of Classification Search
USPC .......................... 707/722, 741, 754, 769, 797
See application file for complete search history.

(56) References Cited

U.S. PATENT DOCUMENTS

| | | | |
|---|---|---|---|
| 2004/0153343 A1* | 8/2004 | Gotlib | G16H 10/60 |
| | | | 705/3 |
| 2007/0005612 A1 | 1/2007 | Goh | |
| 2012/0110515 A1* | 5/2012 | Abramoff | G06F 16/904 |
| | | | 715/854 |
| 2016/0154860 A1* | 6/2016 | Bender | G06F 16/248 |
| | | | 707/754 |
| 2018/0095794 A1* | 4/2018 | Elmahdy | G06F 9/505 |
| 2019/0205833 A1* | 7/2019 | Biro | G06Q 10/0875 |

* cited by examiner

FIG 4A

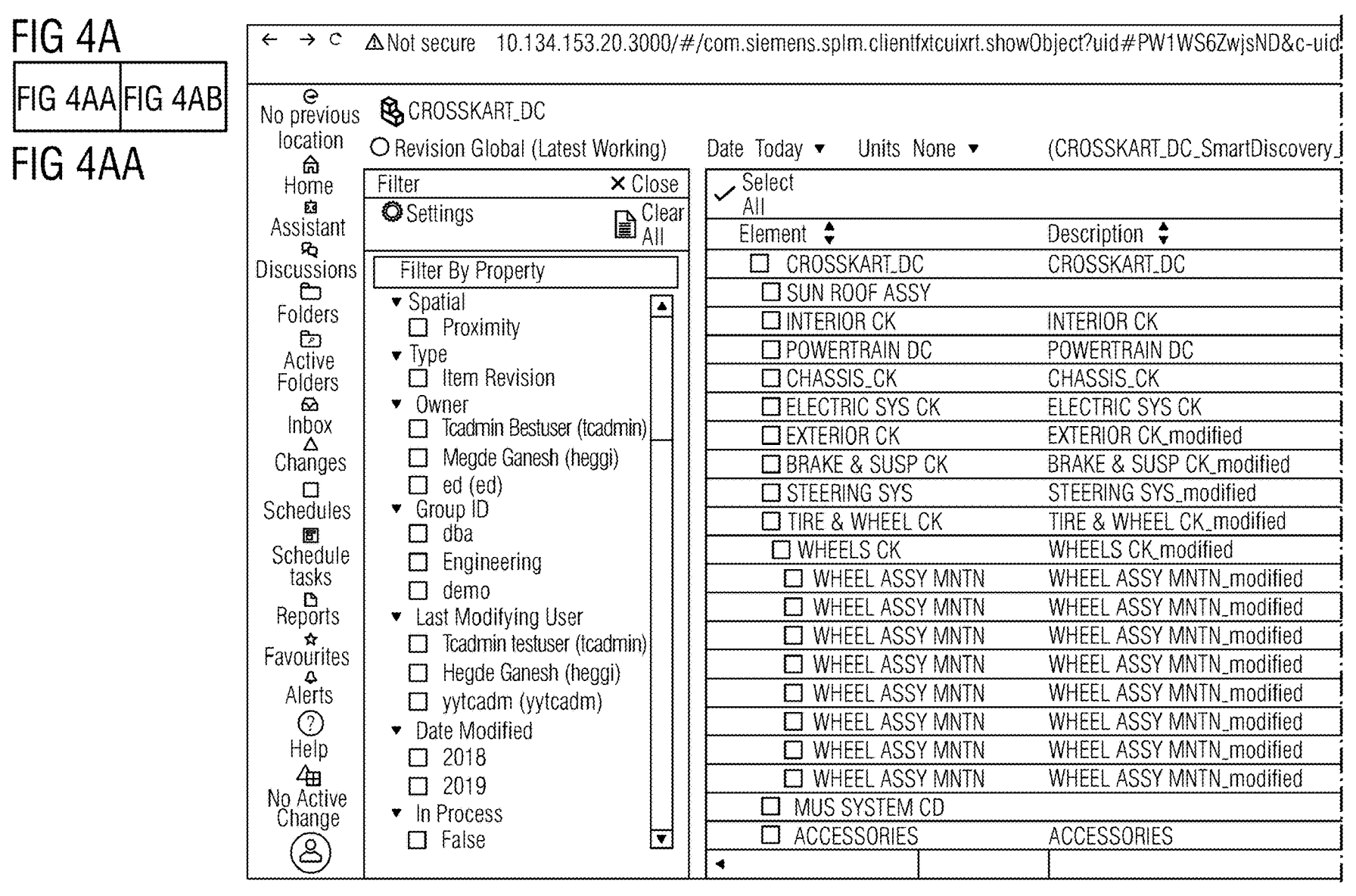

| FIG 4AA | FIG 4AB |
|---|---|

FIG 4AA

Not secure  10.134.153.20.3000/#/com.siemens.splm.clientfxticuixrt.showObject?uid#PW1WS6ZwjsND&c-uid CROSSKART_DC
○ Revision Global (Latest Working)
Filter                                    ✕ Close
○ Settings                                 Clear All Filter By Property ▸ Spatial
  ☐ Proximity
▸ Type
  ☐ Item Revision
▸ Owner
  ☐ Tcadmin Bestuser (tcadmin)
  ☐ Megde Ganesh (heggi)
  ☐ ed (ed)
▸ Group ID
  ☐ dba
  ☐ Engineering
  ☐ demo
▸ Last Modifying User
  ☐ Tcadmin testuser (tcadmin)
  ☐ Hegde Ganesh (heggi)
  ☐ yytcadm (yytcadm)
▸ Date Modified
  ☐ 2018
  ☐ 2019
▸ In Process
  ☐ False No previous location
Home
Assistant
Discussions
Folders
Active Folders
Inbox
Changes
Schedules
Schedule tasks
Reports
Favourites
Alerts
Help
No Active Change Date Today ▸    Units None ▸    (CROSSKART_DC_SmartDiscovery)

✓ Select All

| Element ◆▸ | Description ◆▸ |
|---|---|
| ☐ CROSSKART_DC | CROSSKART_DC |
| ☐ SUN ROOF ASSY | |
| ☐ INTERIOR CK | INTERIOR CK |
| ☐ POWERTRAIN DC | POWERTRAIN DC |
| ☐ CHASSIS_CK | CHASSIS_CK |
| ☐ ELECTRIC SYS CK | ELECTRIC SYS CK |
| ☐ EXTERIOR CK | EXTERIOR CK_modified |
| ☐ BRAKE & SUSP CK | BRAKE & SUSP CK_modified |
| ☐ STEERING SYS | STEERING SYS_modified |
| ☐ TIRE & WHEEL CK | TIRE & WHEEL CK_modified |
| ☐ WHEELS CK | WHEELS CK_modified |
| ☐ WHEEL ASSY MNTN | WHEEL ASSY MNTN_modified |
| ☐ WHEEL ASSY MNTN | WHEEL ASSY MNTN_modified |
| ☐ WHEEL ASSY MNTN | WHEEL ASSY MNTN_modified |
| ☐ WHEEL ASSY MNTN | WHEEL ASSY MNTN_modified |
| ☐ WHEEL ASSY MNTN | WHEEL ASSY MNTN_modified |
| ☐ WHEEL ASSY MNTN | WHEEL ASSY MNTN_modified |
| ☐ WHEEL ASSY MNTN | WHEEL ASSY MNTN_modified |
| ☐ MUS SYSTEM CD | |
| ☐ ACCESSORIES | ACCESSORIES |

FIG 4AB

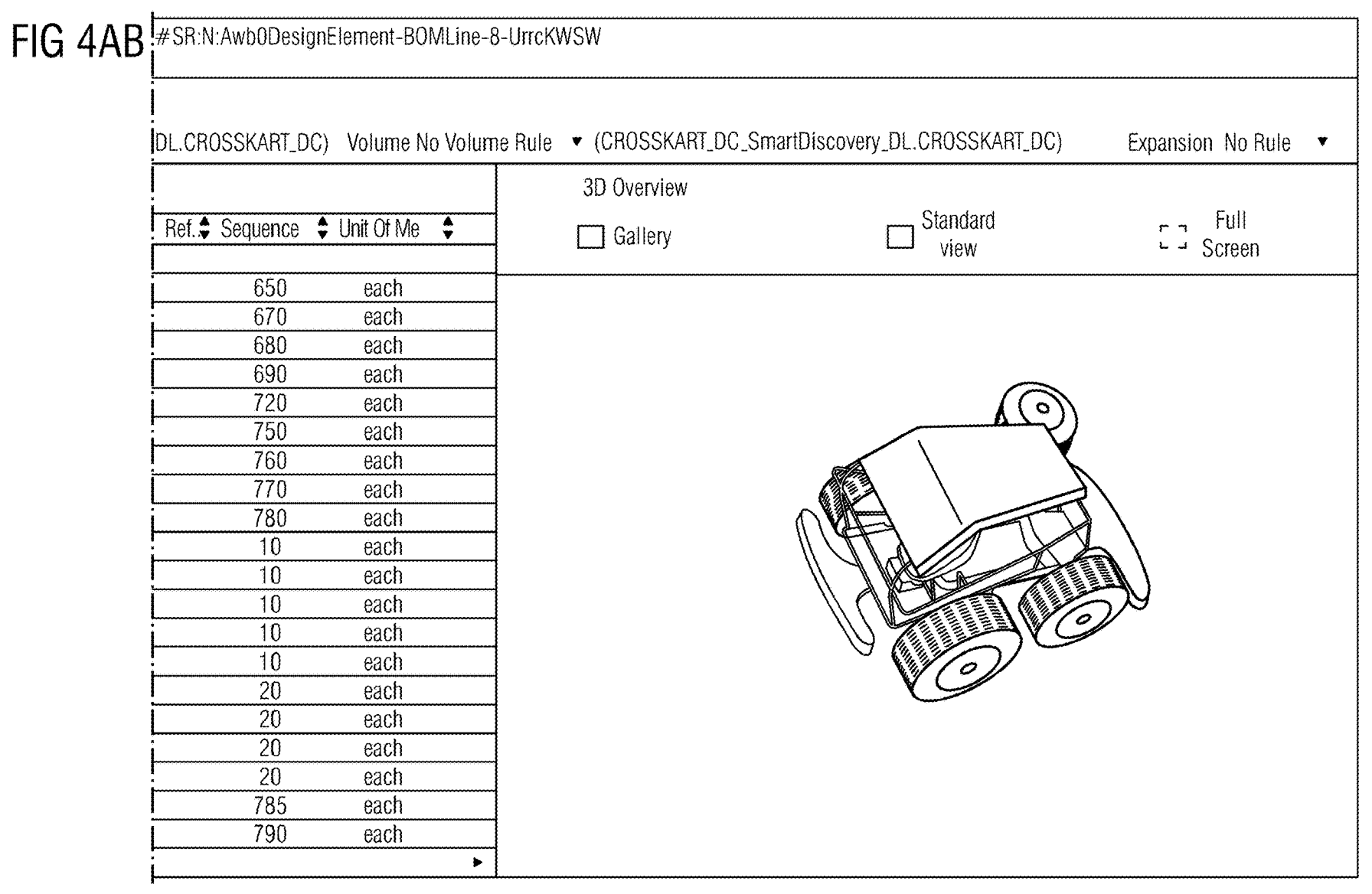

SR:N:Awb0DesignElement-BOMLine-8-UrrcKWSW (DL.CROSSKART_DC)    Volume No Volume Rule    ▾    (CROSSKART_DC_SmartDiscovery_DL.CROSSKART_DC)    Expansion No Rule    ▸

3D Overview

☐ Gallery          ☐ Standard view          ⌐¬ Full ⌊⌋ Screen

| Ref. ◆ | Sequence ◆ | ◆ Unit Of Me ◆▸ |
|---|---|---|
| | 650 | each |
| | 670 | each |
| | 680 | each |
| | 690 | each |
| | 720 | each |
| | 750 | each |
| | 760 | each |
| | 770 | each |
| | 780 | each |
| | 10 | each |
| | 10 | each |
| | 10 | each |
| | 10 | each |
| | 10 | each |
| | 20 | each |
| | 20 | each |
| | 20 | each |
| | 20 | each |
| | 785 | each |
| | 790 | each |

| FIG 4BA | FIG 4BB |
| --- | --- |

FIG 4BA

← → C △ Not secure 10.134.153.20:3000/#/com.siemens.splm.clientfxtcuixrt.showObject?uid#PW1WS6ZwjsND&c-uid No previous location

🏠 CROSSKART_DC

Home    ○ Revision Global (Latest Working)

Assistant

Discussions    Filter    × Close

○ Settings    🗋 Clear All

Folders    For Group ID: 2 Selected    ⊗

Active Folders    AND Within 0.2m of MNTN Wheels_CK_SmartDisc..

Inbox    Filter By Property

Changes    ▸ Spatial    ⬱

Schedules    ☑ Proximity    ⬱

Schedule tasks    ▸ Type    ⬱

☐ Item Revision

Reports    ▸ Owner    ⬱

☐ Tcadmin Bestuser (tcadmin)

Favourites    ☐ ed (ed)

Alerts    ▸ Group ID    ⬱

☑ dba

Help    ☑ Engineering

No Active Change    ☐ demo

▸ Last Modifying User    ⬱

☐ Tcadmin testuser (tcadmin)

☐ Hegde Ganesh (heggi)

☐ yytcadm (yytcadm)

▸ Date Modified    ⬱

☐ 2019

▸ In Process    ⬱

☐ False

Date Today ▾    Units None ▾    (CROSSKART_DC_SmartDiscovery_

✓ Select All

| Element ◂▸ | Description ◂▸ |
| --- | --- |
| ▸ ☐ CROSSKART_DC | CROSSKART_DC |
| ▴ ☐ INTERIOR CK | INTERIOR CK |
| ▴ ☐ POWERTRAIN DC | POWERTRAIN DC |
| ▴ ☐ CHASSIS_CK | CHASSIS_CK |
| ▴ ☐ EXTERIOR CK | EXTERIOR CK_modified |
| ▴ ☐ BRAKE & SUSP CK | BRAKE & SUSP CK_modified |
| ▾ ☐ TIRE & WHEEL CK | TIRE & WHEEL CK_modified |
| ▾ ☐ WHEELS CK | WHEELS CK_modified |
| ▴ ☐ WHEEL ASSY MNTN | WHEEL ASSY MNTN_modified |
| ▴ ☐ WHEEL ASSY CLMB | WHEEL ASSY CLMB_modified |
| ☐ ACCESSORIES | ACCESSORIES |
| ☐ ACCESSORIES | |

FILTERED PRODUCT STRUCTURE

The present patent document is a § 371 nationalization of PCT Application Serial No. PCT/US2021/061740, filed Dec. 3, 2021, designating the United States, which is incorporated by reference in its entirety.

TECHNICAL FIELD

The present disclosure relates to a computer-implemented method of providing a view of a filtered hierarchical data structure.

BACKGROUND

Computer Aided Design (CAD) tools are used frequently in the manufacture of complex products. Such products may be represented within the software as a hierarchical product structure, e.g., displayed in the form of a product tree. This allows a user to interrogate the product structure in a simple manner to view or edit the parts and part assemblies stored within the product structure. Over time, these parts and parts assemblies will undergo a number of revisions, which require configuring to produce a buildable product. For example, in automotive manufacture, a wheel requires several wheel bolts to be affixed to an axle, the wheel itself may be a front, rear, left, or right wheel, the axle will be mounted onto the chassis, the chassis linked to a vehicle model, and so on. This represents a fairly short product tree between the root (the vehicle) and the final item (a wheel bolt), but for a fully configured, buildable product, each wheel bolt requires its own branch in the product structure tree. The resulting configured product may be sizeable.

In order to modify, manipulate, or make choices about the root product, (e.g., the vehicle), a user needs to be able to search for occurrences of parts and part assemblies, individual parts, or revisions of parts within the product structure. Searching and configuring such a product structure may be slow, depending on the volume of data involved, and may be improved by using a cache of the configured product and its explosion into occurrences of parts and part assemblies. However, a caching approach for such configured products has a number of disadvantages. Firstly, each individual configuration of the product requires a separate cache. Each cache needs to be stored and kept up-to-date. Secondly, change management processes lead to change-specific, user-specific, and group-specific configurations of a product. This increases the number of caches required. Lastly, historical configurations will also require a separate cache for each history point, no matter how few or many revisions are made. This increases the number of caches required yet further. Alternative approaches include techniques such as database indexing of paths through the product structure, which whilst an improvement on caching approaches, work well for short time periods. Longer time periods are likely to result in an explosion of paths due to revisions of parts and part assemblies. This may be limited by indexing recent changes over a short timeframe, but this may not be practical or desirable for the user.

It may be desirable to implement certain strategies when looking for occurrences of interest within such a hierarchical product structure. For example, maintaining an unconfigured product structure index, or maintaining progressive levels of detail, such as geometric and spatial information, may be useful when searching for specific items. Executing a suitable query plan, such as one that employs low-cost operations on indexes and coarse levels of detail, will return results quickly when identifying parts and part assemblies. Higher cost operations may then be applied in sequence to subset of identified part assemblies and parts to gain an accurate result. However, regardless of the search strategy, it is important to be able to display the results to a user in a meaningful manner. When results are displayed in a scrollable list, deferred evaluation is a useful strategy for supporting a responsive user interface. It may be possible to see forty to fifty lines in a viewable area of a display, where each line contains a part assembly or part in the hierarchical product structure. Scrolling through the display will yield more lines. To enable this, whilst keeping computing down, execution of a query plan, particularly the high-cost steps, is paused, once enough lines containing part assemblies and parts are produced to fill the viewable area of a display. If the user then scrolls down, the execution of the query plan is restarted and continues until another set of lines containing part assemblies and parts are produced to fill the viewable area of a display and pause again. Such a deferred-evaluation strategy is both responsive and economical, since the user does not have to wait for additional lines to be calculated, nor does the data processing system need to compute lines that the user will never see.

A configured product structure may be displayed in the form of an expandable tree. Again, the user may see forty to fifty lines in the viewable area of the display and may choose to expand and contract lines as well as scroll through the viewable area of the display in order to inspect the product structure. To support a responsive user interface, the product structure may be computed on demand. An expand-on-demand strategy is both responsive and economical, as the user does not need to wait until all lines are expanded and the data processing system does not need to compute lines the user will not see.

Filtering a product structure tree, such that only the parts that match a certain condition and hiding those that do not, is a simple but powerful way of presenting and working with search results. Search result lists with deferred page evaluation and tree navigation with expand-on-demand capabilities have set user expectation high when it comes to responsive user interfaces and the economical use of resources. This may be illustrated using a simple configured product structure tree where a filter is applied. For each line of the product structure tree it is necessary to determine the answers to two questions: (1) Should the line be shown to a user (is it displayable)?; and (2) Should the line have an expand/collapse toggle (is it expandable)?

The answers may be determined using a simple set of rules: (a) If a line contains a part matching the filter condition, it is matched; (b) If a line is the parent of a matched line (a part assembly containing the matched part), it is expandable; (c) If a line is the parent of an expandable line (a part assembly containing an expandable part assembly), it is expandable; and (d) If a line is matched or expandable, it is displayable to the user.

Table 1 shows a simple product structure tree for the part assembly A1, which contains three part assemblies A3, A4, A7, and five parts P2, P5, P6, P8, P9. The filter chosen is "bolt":

TABLE 1

Simple hierarchical product structure tree and filter "bolt"

| Item Name | Item Type | Matched | Expandable | Displayable |
|---|---|---|---|---|
| A1 | | | Yes | Yes |
| P2 | Bolt | Yes | | Yes |
| A3 | | | Yes | Yes |

TABLE 1-continued

Simple hierarchical product structure tree and filter "bolt"

| Item Name | Item Type | Matched | Expandable | Displayable |
|-----------|-----------|---------|------------|-------------|
| A4 | | | Yes | Yes |
| P5 | Bolt | Yes | | Yes |
| P6 | Nut | No | | No |
| A7 | | | No | No |
| P8 | Screw | No | | No |
| P9 | Screw | No | | No |

In order to determine that A1, P2, A3, A4, and P5 are displayable, it has been necessary to configure the entire product structure to evaluate the filter. Whilst for a simple product structure tree that is easily achievable without needing to have the user wait an excessive time or take up much computing resource, a product structure tree for a vehicle, such as a car, for example, will contain many thousands of part assemblies and parts, and therefore take a considerable time to configure on each occasion that the user wishes to apply a filter. In addition, the resulting fully configured product structure would require an undue amount of traversal and processing of individual part assembly lines to achieve a meaningful, workable, and responsive display to the user. There is therefore a need to be able to overcome such issues to enable meaningful filtering of large, complex product structures or other data capable of being represented as a tree data structure.

SUMMARY AND DESCRIPTION

The embodiments of the present disclosure aim to address these issues by providing, in a first aspect, a computer-implemented method of providing a view of a filtered hierarchical data structure, the hierarchical data structure including a tree structure having a data root and a plurality of branch values and leaf values, wherein each branch value has a single parent, which is either another branch value or the data root, and at least one child leaf value, child branch value, descendant branch value, or descendant leaf value, the method including receiving a selection of a filter from a user, the user viewing an initial view of at least a partially configured version of the hierarchical data structure showing at least one expanded branch value at an $n^{th}$ level expansion. The method further includes querying a pre-constructed query index corresponding to the filter against the hierarchical data structure to identify unconfigured paths to descendant leaf values that may correspond to the filter. The method further includes processing the expanded branch value being viewed at the $n^{th}$ level expansion by: i) determining if any child leaf values or any child branch values of the $n^{th}$ level branch value meet the filter, and marking any that match as displayable; ii) based on the identified unconfigured paths, determining if any descendant leaf values or descendant branch values of a first child of $n^{th}$ level branch value meet the filter by configuring each $n^{th}+1$ level until the descendant leaf value is reached; iii) if any descendant leaf value or descendant branch value matches the filter, stopping the configuring at one of the matching descendant leaf values or descendant branch values, marking the descendant leaf value or descendant branch value and at least a portion of the branch values between the descendant leaf value or descendant branch value and the branch value shown in the $n^{th}$ level expansion as displayable and moving to a second child of the $n^{th}$ level branch value to process; iv) if no descendant leaf value or descendant branch value matches the filter, moving to a second child of the $n^{th}$ level branch value to process. The method further includes, when all of the child branch values of the $n^{th}$ level branch value have been processed, repeating the processing of the expanded branch value for all other branch values shown as expanded in the initial view. The method further includes displaying a revised view of the at least a partially configured version of the hierarchical data structure showing only those branch values from the initial view in which a branch value, descendant leaf value, descendant branch value, child leaf value, or child branch value were marked as displayable.

Embodiments of the present disclosure therefore offer the advantages of the deferred evaluation associated with results displayed in a scrollable list on a display, as well as benefits similar to expand-on-demand and search paging.

In the processing of the expanded branch value, the configuring may be stopped at the first descendant leaf value or descendant branch value matching the filter. All of the branch values between the descendant leaf value or descendant branch value and the branch value shown in the $n^{th}$ level expansion may be marked as displayable.

When the user wishes to view the $n^{th}+1$ level expansion of the branch value being viewed at the $n^{th}$ level expansion of the hierarchical data structure, the method may further include repeating the processing of the expanded branch value, the repeating of the processing, and the displaying of the revised view for the children of the $n^{th}$ level branch value.

The order of the processing of descendant branch values may be determined by the number of levels between a branch value at the $n^{th}$ level of expansion and its descendant leaf value. Alternatively, the order of the processing of child branch values may be determined by whether or not a descendant branch value matches or partially matches a descendant branch value that has already been processed. Yet further alternatively, the order of the processing of child branch values may be random. If a path does not lead to a descendant leaf value or descendant branch value, any further paths that descend from such a path are excluded from processing.

The branch values displayed in a level expansion may be provided with an interactive expansion control.

The hierarchical data structure may be a hierarchical product structure, wherein the data root is the product, and wherein a branch value is a part assembly, and a leaf value is a part that is configurable to form part of the product. In this situation, the query index may be one of a spatial query, a textual query, or an attribute query.

Alternatively, the hierarchical data structure may be a requirement breakdown structure, a functional decomposition structure or manufacturing process plan.

In a second aspect, embodiments of the present disclosure also provide a computer program product including instructions that when executed by a computer cause the computer to carry out the acts of any of method described above.

In a third aspect, embodiments of the present disclosure also provide a data processing system configured to provide a view of a filtered hierarchical data structure, the hierarchical data structure including tree structure having a data root and a plurality of branch values and leaf values, wherein each branch value has a single parent, which is either another branch value or the data root, and at least one child leaf value, child branch value, descendant branch value, or descendant leaf value. The data processing system includes a user input device configured to selection of a filter from a user, the user viewing an initial view of at least a partially configured version of the hierarchical data structure showing at least one expanded branch value at an $n^{th}$ level expansion. The data processing system further includes a processor configured to: query a pre-constructed query index corresponding to the filter against the hierarchical data structure to identify unconfigured paths to descendant leaf values that may correspond to the filter; the expanded branch value being viewed at the $n^{th}$ level expansion determine if any child leaf values or any child branch values of the $n^{th}$ level branch value meet the filter, and marking any that match as displayable; based on the identified unconfigured paths, determine if any descendant leaf values or descendant branch values of a first child of $n^{th}$ level branch value meet the filter by configuring each $n^{th}+1$ level until the descendant leaf value or descendant branch value is reached; if any descendant leaf value or descendant branch value matches the filter, stop the configuring at one of the matching descendant leaf value or descendant branch value, mark the descendant leaf value or branch value and at least a portion of the branch values between the descendant leaf value or descendant branch value and the branch value shown in the $n^{th}$ level expansion as displayable and moving to a second child of the $n^{th}$ level branch value to process; if no descendant leaf matches the filter, move to a second child of the $n^{th}$ level branch value to process; when all of the child branch values of the $n^{th}$ level branch value have been processed, repeat the processing for all other branch values shown in the initial view. The data processing system further includes a user display configured to display a revised view of the at least a partially configured version of the hierarchical data structure showing only those branch values from the initial view in which a branch value, descendant leaf value, descendant branch value, child leaf value, or child branch value were marked as displayable.

BRIEF DESCRIPTION OF THE DRAWINGS

The disclosure will now be described by way of example only, and with reference to the accompanying drawings, in which:

FIG. 4*a* is a screenshot of an initial view of a hierarchical product structure of a vehicle showing both a first level and a third level expansion of parts and part assemblies.

DETAILED DESCRIPTION

The embodiments of the present disclosure are able to offer the user a responsive user interface with a filtered hierarchical product structure or other data structure having a tree-like arrangement of values that matches or exceeds expectations based on deferred evaluation approaches for scrolled views or expand-on-demand approaches for product trees. The following terminology is used within the description for clarity.

As used herein, the term "hierarchical data structure" refers to a tree-like data structure such as a product structure or a set of bill of materials (BOM) assembly lines within a CAD or other data processing system.

As used herein, the term "data root" refers to the highest level within the data structure such as a product.

As used herein, the term "branch value" refers to an assembly of values, such as a part assembly, within the data structure, each branch value has a single parent that is either another branch value or the data root and at least one descendant branch value or descendant leaf value.

As used herein, the term "leaf value" refers to a single value, such as a part, having a child relationship with a branch value and representing the lowest level of the data structure.

Figure 1:
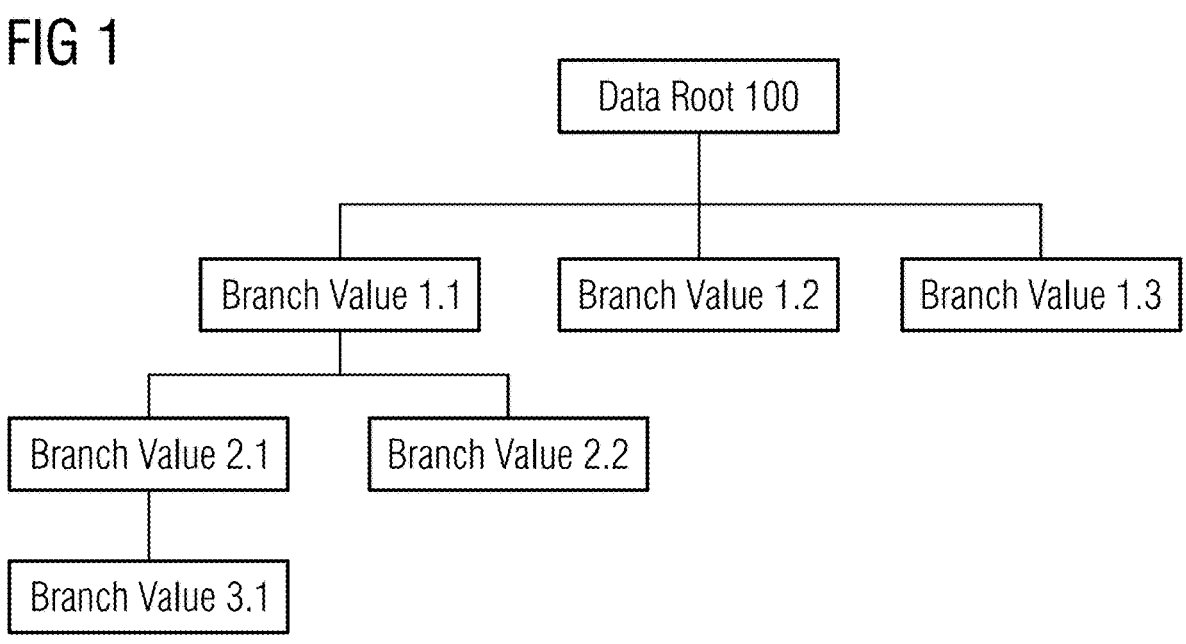
FIG. 1 is an example of a tree-like data structure.

As used herein, the term "child" refers to the value in the immediate level down from a value of interest (for example, branch value 2.1 is the child of branch value 1.1 in FIG. 1).

As used herein, the term "descendant" refers to a value on lower level having a distant child relationship (grandchild, great grandchild and so on) with the value of interest (leaf value 3.1 is a descendant of branch value 1.1 in FIG. 1).

As used herein, the term "path" refers to the route through the data structure to reach a leaf value.

The embodiments of the present method of provide a view of a filtered hierarchical data structure. As defined above, the hierarchical data structure includes a tree structure having a data root and a plurality of branch values and leaf values. Each branch value has a single parent that is either another branch value or the data root and at least one child leaf value, child branch value, descendant branch value, or descendant leaf value. An example of a tree-like data structure is illustrated in FIG. 1, where the data root 100 is shown as the highest level of the hierarchical data structure. The first child level of the data root 100 shows three branch values, with the nomenclature 1.1, 1.2, and 1.3, representing three different groupings leading to a leaf value. For example, for a hierarchical product structure where the product is the data root 100, a first level of part assemblies would be the first child level. For simplicity, only one grouping is shown as progressing beyond the first child level in FIG. 1, where the second child level, or grandchildren of the data root, are branch values 2.1 and 2.2, and the leaf value at the great-grandchild level is leaf value 3.1. The nomenclature therefore indicates the child level (the first digit, n) and the parent-child relationship identity (the second digit, m) of each value, or n·m. The $n^{th}$ child level therefore represents the $n^{th}$ level expansion of the data root.

Initially, a selection of a filter is received from a user who is viewing an initial view of at least a partially configured version of the hierarchical data structure showing at least one expanded branch value at an $n^{th}$ level expansion. In order to filter the hierarchical data structure, a preconstructed query index corresponding to the filter is queried against the hierarchical data structure to identify unconfigured paths to descendant leaf values that may correspond to the filter. The preconstructed query index and its generation is explained in greater detail below. Once this is done, a first processing loop begin by processing the expanded branch value being viewed at the $n^{th}$ level expansion. Initially, a determination of if any child leaf values or any child branch values of the $n^{th}$ level branch value meet the filter and marking any that match as displayable is carried out.

Based on the identified unconfigured paths, it is necessary to determine whether any descendant leaf values or descendant branch values of a first child of $n^{th}$ level branch value meet the filter by configuring each $n^{th}+1$ level until the descendant leaf value or descendant branch value is reached. If any descendant leaf value or descendant branch value matches the filter, the configuration is stopped at one of the matching descendant leaf values or descendant branch values, and the descendant leaf value or descendant branch value and at least a portion of the branch values between the descendant leaf value or descendant branch value and the branch value shown in the $n^{th}$ level expansion are marked as displayable.

The process then moves to a second child of the $n^{th}$ level branch value and continues. However, if no descendant leaf value or descendant branch value matches the filter, the process moves to a second child of the $n^{th}$ level branch value to process immediately. When all of the child branch values of the $n^{th}$ level branch value have been processed, the process moves to the second loop by repeating the processing for all other branch values shown in the initial view. The overall process may therefore be seen as a loop within a loop, where the inner loop defines the processing of the paths from an individual branch value shown in the $n^{th}$ level expansion, and the outer loop defines the processing of all of the expanded branch values shown in the initial view. These may be at various expansion levels, not necessarily at the n-level expansion.

Finally, a revised view of the at least a partially configured version of the hierarchical data structure is then displayed to the user, showing only those branch values from the initial view in which a branch value, descendant leaf value, descendant branch value, child leaf value, or child branch value were marked as displayable. The acts of this method are described further in relation to the embodiments in accordance with the present disclosure below.

Figure 2:
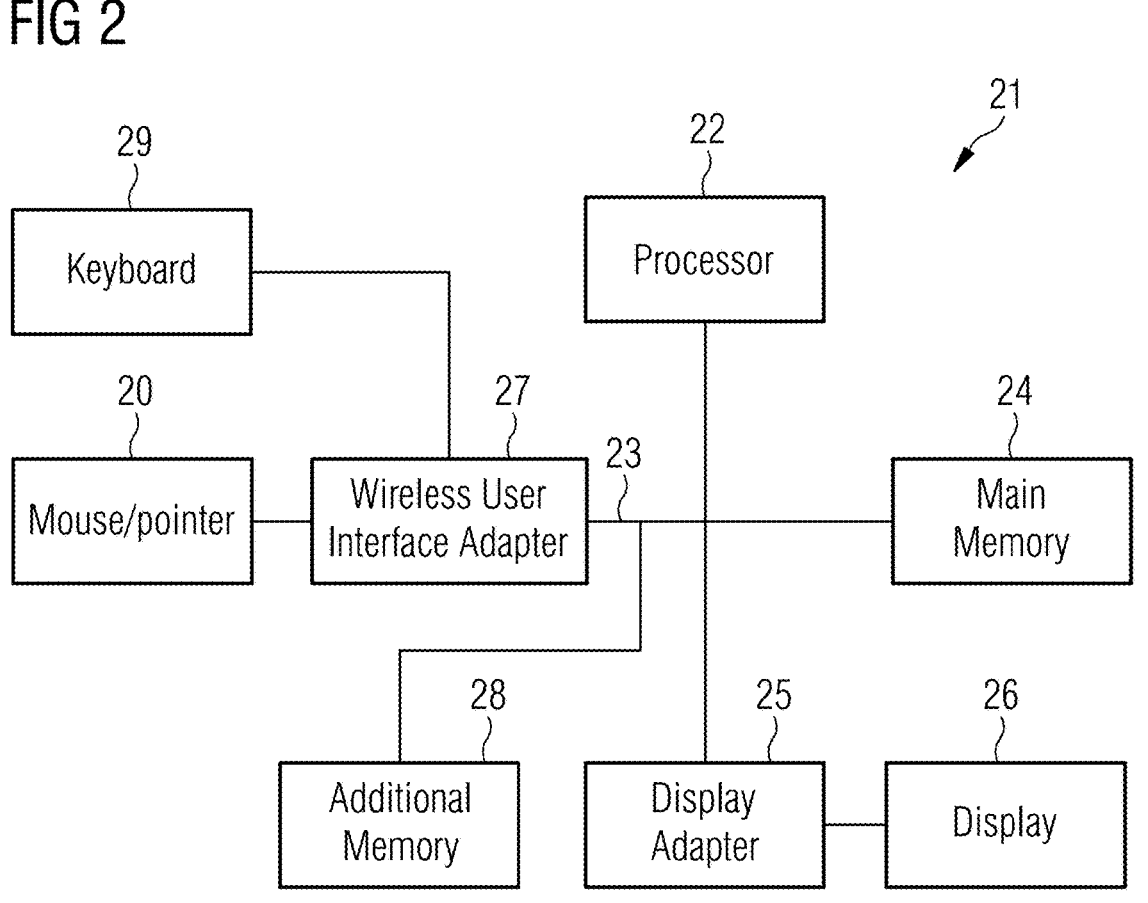
FIG. 2 is a schematic representation of an example of a data processing system configured to carry out the embodiments of the present disclosure.

FIG. 2 illustrates an example of a data processing system in which an embodiment of the present disclosure may be implemented, for example, a CAD system configured to perform processes as described herein. The data processing system 20 includes a processor 21 connected to a local system bus 22. The local system bus connects the processor to a main memory 23 and graphics display adaptor 24, which may be connected to a display 25. The data processing system may communicate with other systems via a wireless user interface adapter connected to the local system bus 22, or via a wired network, for example, to a local area network. Additional memory 26 may also be connected via the local system bus. A suitable adaptor, such as wireless user interface adapter 27, for other peripheral devices, such as a keyboard 28 and mouse 29, or other pointing device, allows the user to provide input to the data processing system. Other peripheral devices may include one or more I/O controllers such as USB controllers, Bluetooth controllers, and/or dedicated audio controllers (connected to speakers and/or microphones). Various peripherals may be connected to the USB controller (via various USB ports) including input devices (e.g., keyboard, mouse, touch screen, trackball, camera, microphone, scanners), output devices (e.g., printers, speakers), or any other type of device that is operative to provide inputs or receive outputs from the data processing system. Further, devices referred to as input devices or output devices may both provide inputs and receive outputs of communications with the data processing system. Further, other peripheral hardware connected to the I/O controllers may include any type of device, machine, or component configured to communicate with a data processing system.

An operating system included in the data processing system enables an output from the system to be displayed to the user on the display 25 and the user to interact with the system. Examples of operating systems that may be used in a data processing system may include Microsoft Windows™, Linux™, UNIX™, iOS™, and Android™ operating systems.

In addition, the data processing system 20 may be implemented as in a networked environment, distributed system environment, virtual machines in a virtual machine architecture, and/or cloud environment. For example, the processor 21 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system 20 may vary for particular implementations. For example, the data processing system 20 in this example may correspond to a computer, workstation, and/or a server. However, alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

The data processing system 20 may be connected to the network (not a part of data processing system 20), which may be any public or private data processing system network or combination of networks, as known to those of skill in the art, including the Internet. The data processing system 20 may communicate over the network with one or more other data processing systems such as a server (also not part of the data processing system 20). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network. The data processing system 20 is configured to carry out the methods in accordance with the embodiments described below. For example, the keyboard 28 and mouse 29 may function as a user input device for receiving information from the user, the processor 21 may be configured to carry out the acts of the method and the display 25 configured to display a particular view to the user.

In order to create a meaningful display of a filtered data structure to a user, embodiments of the present disclosure consider how a branch value, such as a product assembly, may be expanded. For each unfiltered descendant branch value or descendant leaf value it is necessary to decide:

Does a descendant branch value or descendant leaf value match the filter?

Is a descendant branch value expandable (it has a matched descendant branch value or descendant leaf value)?

Returning to the example of Table 1 above, the first level expansion of the assembly A1 showing the unfiltered part and part assemblies is:

A1
    P2
    A3
    A7

In order to filter the assembly it is necessary to build a query index, which identifies paths through the hierarchical data structure to individual parts as show in Table 2 below:

TABLE 2

| query index | |
| --- | --- |
| Path | Result |
| A1 | |
| A1/P2 | Bolt |
| A1/A3 | |
| A1/A3/A4 | |
| A1/A3/A4/P5 | Bolt |
| A1/A3/A4/P6 | Nut |
| A1/A7 | |
| A1/A7/P8 | Screw |
| A1/A7/P9 | Screw |

Any suitable method may be used for generating the query index. Querying for bolts against this query index produces the query index results:

| A1/P2: | bolt |
| --- | --- |
| A1/A3/A4/P5: | bolt |

From this, it may be seen that the part assembly A7 is not expandable, since the path A1/A7 does not appear either as a query result or as the prefix to a query result. P2 may be a match, since the path A1/P2 is in the results, hence this requires further investigation. The part assembly A3 may be expandable since the path A1/A3 appears as the prefix to a result, hence this also requires further investigation. The identified paths may be tested by configuring the part assemblies and parts to determine if the identified part is actually a match for the filter, and by sampling paths that appear as a prefix to determine which descendant matches the filter. These are higher computing cost operations and so have been deferred until the original hierarchical product structure has been reduced to likely candidates for a match. This maintains a quick response time for the user. Table 3 shows the algorithm results for the first level expansion of A1 (where A4 and P5 are not listed as these come from further expansions of A3) and whether or not they are matched, expandable, or displayable based on the rules above:

TABLE 3

| algorithm results for the first level expansion of A1 | | | |
| --- | --- | --- | --- |
| Item Name | Matched | Expandable | Displayable |
| A1 | | Yes | Yes |
| P2 | Yes | | Yes |
| A3 | | Yes | Yes |
| A7 | | | |

This may then be condensed to show a first level expansion of the part assembly A1, where, since the part assembly A3 is both expandable and displayable, A3 is provided with an expansion control. This methodology may be extended and generalized to cover hierarchical data structures containing many hundreds or thousands of data values, such as complex product structures with many levels of hierarchy, in the embodiments of the present disclosure.

Figure 3:
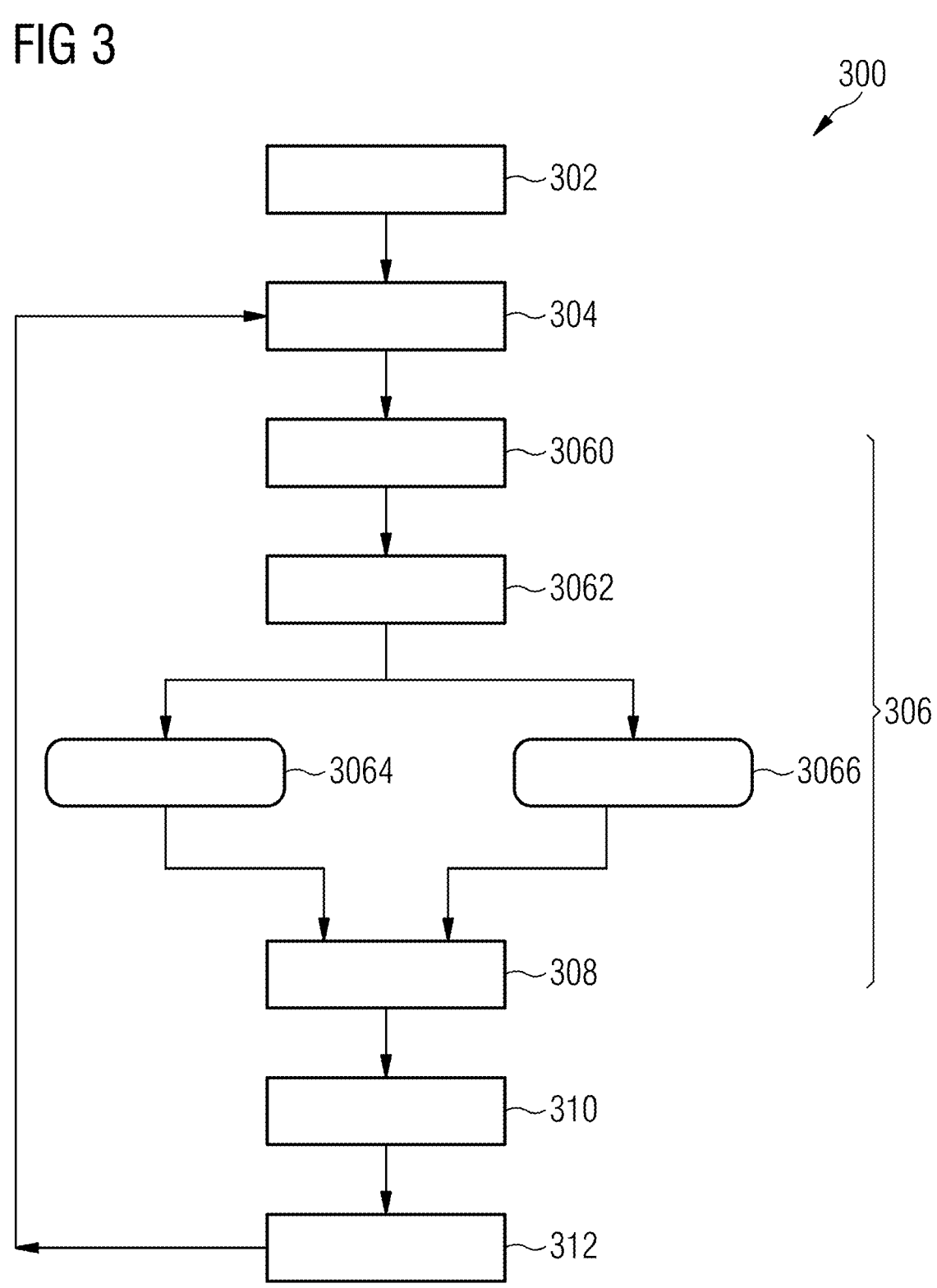
FIG. 3 is a flow chart illustrating a method in accordance with embodiments of the present disclosure.

FIG. 3 is a flow chart illustrating a method in accordance with embodiments of the present disclosure. At act 302 of the method, a selection of a filter is received from a user. This is via the keyboard 28 and mouse 29. The user is viewing an initial view of at least a partially configured version of a hierarchical data structure. The initial view may be determined by the size of a viewable area of the display 25 or limited in size within a window or other display element determined by software running on the processor 21. The initial view shows at least one expanded branch value at an $n^{th}$ level expansion, as illustrated in FIG. 4a. FIG. 4a is a screenshot of an initial view of a hierarchical product structure of a vehicle showing both a first level and a third level expansion of parts and part assemblies. The "WHEEL ASSY MNTN" and "WHEEL ASSY CLMB" part assemblies are shown as a third level expansion, such that n=3, whereas the remaining part assemblies are shown as a first level expansion.

At act 304, a preconstructed query index corresponding to a filter is queried against the hierarchical data structure to identify unconfigured paths to descendant leaf values that may correspond to the filter. In FIG. 4a, a number of filters may be seen, including spatial proximity, modification dates and users, owners, and identification. Preconstructed query indexes are available for these filters.

At this point, the first inner process loop begins, as at act 306 processing the expanded branch value being viewed at the $n^{th}$ level expansion is initiated.

At act 3060, a determination of if any child leaf values or any child branch values of the $n^{th}$ level branch value meet the filter is carried out and any that match are marked as displayable.

At act 3062, based on the identified unconfigured paths, if any descendant leaf values or descendant branch values of a first child of $n^{th}$ level branch value meet the filter is determined by configuring each $n^{th}+1$ level until the descendant leaf value or descendant branch value is reached. Considering the product structure of FIG. 4a, and taking the n=3 level expansion, and a preconstructed query index for Group ID and proximity of within 0.2 m of "MTN WHEEL-S_CK_SMARTDISC," some or all of the parts and part assemblies of the first "WHEEL ASSY MNTN" are configured to determine whether or not the filter criteria are met.

At act 3064, if any descendant leaf value or descendant branch value matches the filter, the configuring is stopped at one of the matching descendant leaf values or descendant branch values, and the descendant leaf value or descendant branch value and at least a portion of the branch values between the descendant leaf value or descendant branch value and the branch value shown in the $n^{th}$ level expansion are marked as displayable. The configuring may be stopped at the first descendant leaf value or descendant branch value matching the filter. Also, all of the branch values between the descendant leaf value or the descendant branch value and the branch value shown in the $n^{th}$ level expansion may be marked as displayable. However, it may be desirable to stop the configuring act at the second, third or other matching descendant leaf value or descendant branch value, depending on the nature of the data structure. And whilst marking all of the intervening branch values alternative approaches such as marking every other branch value may help to reduce processing time. For the example of FIG. 4a, one of the parts meeting the filter and being within the "WHEEL ASSY MNTN" product assembly will be marked. At the point the marking is done, the method 300 moves to process a second child of the $n^{th}$ level branch value. There will be other branch values that will be skipped in the process as a match has been found.

Alternatively, at act 3066, if no descendant leaf value or descendant branch value matches the filter, then the method moves straight to a second child of the $n^{th}$ level branch value to being processing.

At act 308, the processing of the second loop begins, when all of the child branch values of the $n^{th}$ level branch value have been processed, act 306 is repeated for all other branch values shown as expanded in the initial view. Hence it is possible to imagine that the outer processing loop provides that each visible descendant branch value of the data root that is visible to the user in the initial view is processed in turn, and that the inner processing loop is to query the query index against descendants of each visible descendant branch value.

Figure 4B:
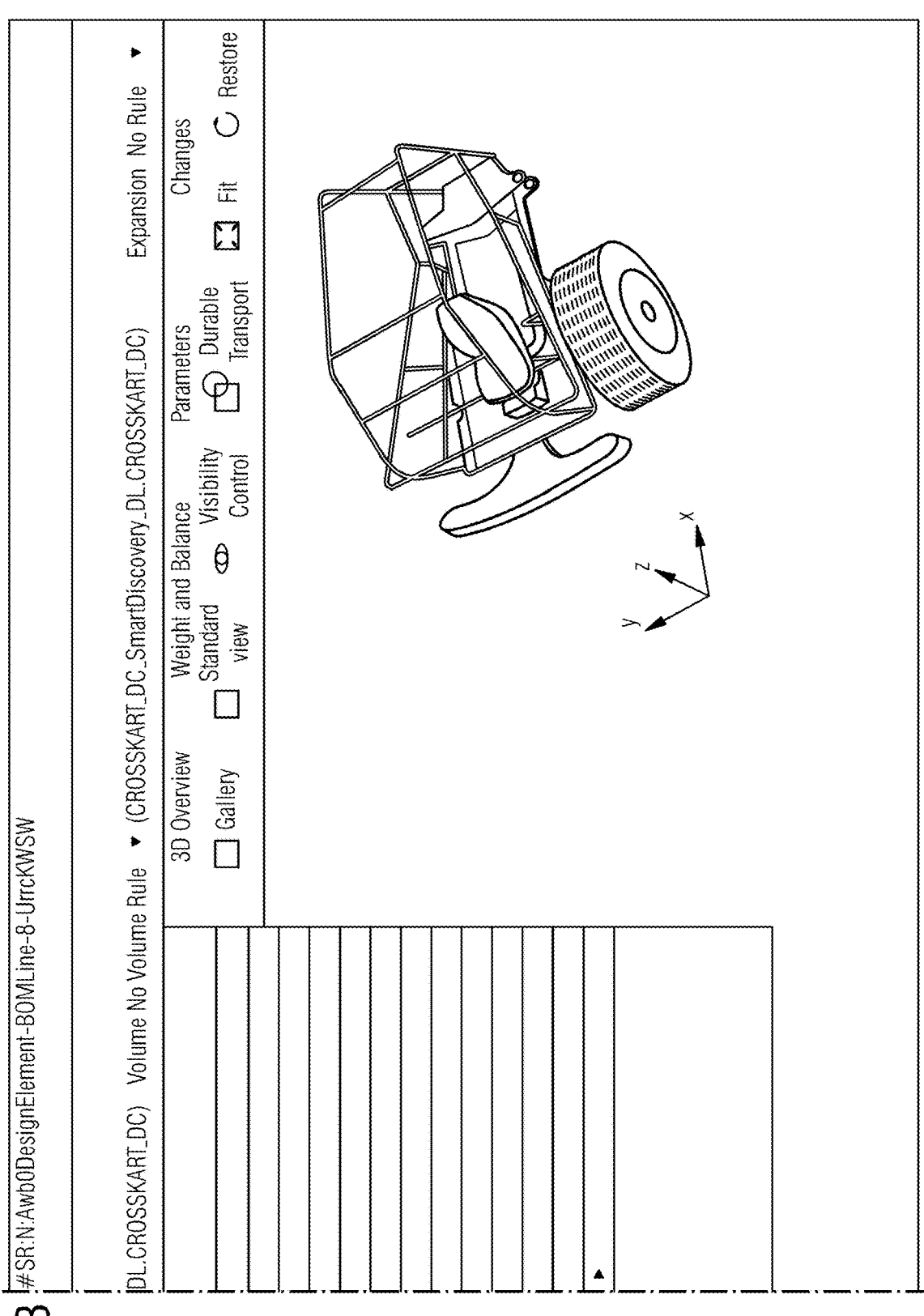
FIG. 4*b* is a screenshot of a revised view of a hierarchical product structure of a vehicle showing both a first level and a third level expansion of parts and part assemblies.

Once act 308 is completed, at act 310, a revised view of the at least a partially configured version of the hierarchical data structure is displayed showing only those branch values and leaf values from the initial view in which a branch value, descendant leaf value, descendant branch value, child leaf value, or child branch value were marked as displayable. Turning to FIG. 4*b*, which is a screenshot of a revised view of a hierarchical product structure of a vehicle showing both a first level and a third level expansion of parts and part assemblies, only those branch values in either the first level or third level expansion for which a descendant branch value or descendant leaf value matches the filters is shown. Therefore, for the vehicle ("CROSSKART_DC") only those part assemblies having a child part or a descendant part meeting the Group ID and spatial proximity filters are shown.

Once the revised view is shown to the user, it is possible that the user may decide to expand the hierarchical data structure further. Each branch value is provided with an interactive expansion control in the initial and revised views to enable this. For example, at act 310, the user decides they wish to view the $n^{th}+1$ level expansion of the branch value being viewed at the $n^{th}$ level expansion of the hierarchical data structure. On selecting this branch value in the data structure and clicking the expansion control, acts 306 and 308 will be repeated for the children of the $n^{th}$ level branch value. A new revised view is shown to the user at act 312, this time showing the filter results for the $n^{th}+1$ level where either the child leaf value or child branch value matches the filter, or a descendent leaf-or-branch value matches the filter.

Given that a hierarchical data structure may have many thousands of branch values and leaf values associated with it, it may also be desirable to introduce an element of sampling and feedback to the acts of the method 300 outlined above. For example, the order of the processing of child branch values may be determined by the number of levels between a branch value at the $n^{th}$ level of expansion and its descendant leaf value. Given a choice between longer and shorter paths through the hierarchical data structure to a descendant leaf value that may satisfy the filter, then choosing the shortest first and working through the descendant branch values in path length order may yield a faster result, since processing will stop at the first successful filter match. Taking the simple example above, it is faster to process A1/P2 than it is to process A1/A3/A4/P5. In the example above, it was shown that for a filter "bolt," the path A1/A7/P8 did not lead to a result, therefore it is possible to exclude any path containing A1/A7 from any further method acts. A1/A7 is not an assembly that is used in the chosen configuration, for example, in a vehicle a user may specify a petrol engine and A7 may be a diesel engine. Hence, if a path does not lead to a descendant leaf value or descendant branch value, any further paths that descend from such a path are excluded from processing. Similarly, the order of the processing of child branch values may be determined by whether or not a branch value matches or partially matches a descendant branch value that has already been processed. From the example above, A1/A3/A4/P5 was shown to lead to a positive match, so when processing the branch value A3 all other paths beginning A1/A3 may be excluded. Another example of the positive use of feedback is to consider the case of using the query index in Table 2 but this time to set the filter to "nuts and bolts." Filtering against the query index gives the results:

| | |
|---|---|
| A1/P2: | bolt |
| A1/A3/A4/P5: | bolt |
| A1/A3/A4/P6: | nut |

In order to determine whether the part assembly A3 is expandable, A1/A3/A4/P5 is sampled first and shown to be configured out at A4. Therefore, every other path with the prefix A1/A3/A4 will also be configured out, including the remaining sample A/A3/A4/P6. Consequently, A3 is not expandable and will not be displayed to the user. Alternatively, still, depending on the size of the hierarchical data structure, order of the processing of child branch values may be random.

As in the embodiment shown in FIGS. 4*a* and 4*b*, the hierarchical data structure may be a hierarchical product structure, where the data root is the product, and where a branch value is a part assembly, and a leaf value is a part that is configurable to form part of the product. In this situation, the query index may be one of a spatial query, a textual query, or an attribute query. For spatial queries, a bounding box approach may be used, where geometry whose bounding box is fully contained by a spatial box zone is more likely to match the filter than a geometry whose bounding box has only a small spatial overlap. Alternatively, the hierarchical data structure may be a requirement breakdown structure, a functional decomposition structure or manufacturing process plan. The same principles apply as each of these has a tree-like data structure.

Embodiments of the present disclosure therefore offer the advantages of the deferred evaluation associated with results displayed in a scrollable list on a display, as well as benefits similar to expand-on-demand and search paging. Performance is improved and computing cost reduced due to the ability to delay higher cost operations whilst still providing a responsive user interface. Sampling possible search results and using existing information gained from such sampling as feedback enables an expandable display to be generated without the risk of the number of samples increasing dramatically when large subassemblies of parts or branch values are configured out during execution of the embodiments described herein.

The invention claimed is:

1. A computer-implemented method of providing a view of a filtered hierarchical data structure, the hierarchical data structure comprising a tree structure having a data root, a plurality of branch values, and a plurality of leaf values, wherein each branch value of the plurality of branch values has a single parent that is either another branch value or the data root, and at least one child leaf value, child branch value, descendant branch value, or descendant leaf value, the method comprising:

a) retrieving, by a processor, the hierarchical data structure from a memory storing the hierarchical data structure;

b) receiving, by the processor via a user input device, a selection of a filter from a user, the user viewing an initial view of at least a partially configured version of the hierarchical data structure showing at least one expanded branch value at an n-th level expansion;

c) querying, by the processor, a pre-constructed query index corresponding to the filter against the hierarchical data structure to identify unconfigured paths to descendant leaf values that may correspond to the filter;

d) processing, by the processor, the expanded branch value being viewed at the n-th level expansion by:

determining when any child leaf values or any child branch values of an n-th level branch value meet the filter, and marking any that match as displayable;

determining, based on the identified unconfigured paths, when any descendant leaf values or any descendant branch values of a first child of the n-th level branch value meet the filter by configuring each n-th+1 level until the descendant leaf value or descendant branch value is reached;

stopping the configuring, when any descendant leaf value or descendant branch value matches the filter, at one of the descendant leaf values or descendant branch values, marking the descendant leaf value or descendant branch value and at least a portion of the branch values between the descendant leaf value or descendant branch value and the branch value shown in the n-th level expansion as displayable and moving to a second child of the n-th level branch value to process; and moving to the second child of the n-th level branch value to process when no descendant leaf value or descendant branch value matches the filter;

e) repeating act d), when all of the child branch values of the n-th level branch value have been processed, for all other branch values shown as expanded in the initial view; and f) storing, by the memory, and displaying, by a display, a revised view of the at least partially configured version of the hierarchical data structure showing only those branch values from the initial view in which a branch value, descendant leaf value, descendant branch value, child leaf value, or child branch value were marked as displayable.

2. The computer-implemented method of claim 1, wherein, in act d), the configuring is stopped at a first descendant leaf value or descendant branch value matching the filter.

3. The computer-implemented method of claim 1, wherein, in act d), all of the branch values between the descendant leaf value or descendant branch value and the branch value shown in the n-th level expansion are marked as displayable.

4. The computer-implemented method of claim 1, wherein, when the user requests to view an n-th+1 level expansion of the branch value being viewed at the n-th level expansion of the hierarchical data structure, the method further comprises:

repeating acts d), e), and f) for children of the n-th level branch value.

5. The computer-implemented method of claim 1, wherein an order of the processing of descendant branch values is determined by a number of levels between a branch value at the n-th level of expansion and its descendant leaf value.

6. The computer-implemented method of claim 1, wherein an order of the processing of descendant branch values is determined by whether or not a branch value matches or partially matches a descendant branch value that has already been processed.

7. The computer-implemented method of claim 1, wherein an order of the processing of descendant branch values is random.

8. The computer-implemented method of claim 1, wherein, when a path does not lead to a descendant leaf value or descendant branch value, any further paths that descend from such a path are excluded from processing.

9. The computer-implemented method of claim 1, wherein the branch values displayed in a level expansion are provided with an interactive expansion control.

10. The computer-implemented method of claim 1, wherein the hierarchical data structure is a hierarchical product structure, wherein the data root is the product, wherein a branch value is a part assembly, and wherein a leaf value is a part that is configurable to form part of the product.

11. The computer-implemented method of claim 10, wherein the query index is one of a spatial query, a textual query, or an attribute query.

12. The computer-implemented method of claim 1, wherein the hierarchical data structure is a requirement breakdown structure, a functional decomposition structure, or manufacturing process plan.

13. The computer-implemented method of claim 2, wherein, in act d), all of the branch values between the descendant leaf value or descendant branch value and the branch value shown in the n-th level expansion are marked as displayable.

14. The computer-implemented method of claim 13, wherein, when the user requests to view an n-th+1 level expansion of the branch value being viewed at the n-th level expansion of the hierarchical data structure, the method further comprises:

repeating acts d), e), and f) for children of the n-th level branch value.

15. The computer-implemented method of claim 14, wherein an order of the processing of descendant branch values is determined by a number of levels between a branch value at the n-th level of expansion and its descendant leaf value.

16. The computer-implemented method of claim 14, wherein an order of the processing of descendant branch values is determined by whether or not a branch value matches or partially matches a descendant branch value that has already been processed.

17. A data processing system configured to provide a view of a filtered hierarchical data structure, the hierarchical data structure comprising tree structure having a data root, a plurality of branch values, and a plurality of leaf values, wherein each branch value of the plurality of branch values has a single parent that is either another branch value or the data root, and at least one child leaf value, child branch value, descendant branch value, or descendant leaf value, the data processing system comprising:

a user input device configured to receive a selection of a filter from a user, the user viewing an initial view of at least a partially configured version of the hierarchical data structure showing at least one branch value at an n-th level expansion;

a memory configured to store the hierarchical data structure;

a display; and a processor configured to:

retrieve the hierarchical data structure from the memory;

query a pre-constructed query index corresponding to the filter against the hierarchical data structure to identify unconfigured paths to descendant leaf values that may correspond to the filter;

process an expanded branch value being viewed at the n-th level expansion by: i) determining when any child leaf values or any child branch values of an n-th level branch value meet the filter, and marking any that match as displayable; ii) determining, based on the identified unconfigured paths, when any descendant leaf values or any descendant branch values of a first child of the n-th level branch value meet the filter by configuring each n-th+1 level until the descendant leaf value or descendant branch value is reached; iii) stopping the configuring, when any descendant leaf value or descendant branch value matches the filter, at one of the descendant leaf values or descendant branch values, marking the descendant leaf value or descendant branch value and all at least a portion of the branch values between the descendant leaf value or descendant branch value and the branch value shown in the n-th level expansion as displayable and moving to the second child of the n-th level branch value to process; iv) moving to a second child of the n-th level branch value to process when no descendant leaf value or descendant branch value matches the filter; and repeat steps i) to iv) for all other branch values shown as expanded in the initial view when all child branch values of the n-th level branch value have been processed, wherein the memory is configured to store and the display is configured to display a revised view of the at least partially configured version of the hierarchical data structure showing only those branch values from the initial view in which a branch value, descendant leaf value, descendant branch value, child leaf value, or child branch value were marked as displayable.

* * * * *